Figure 1:
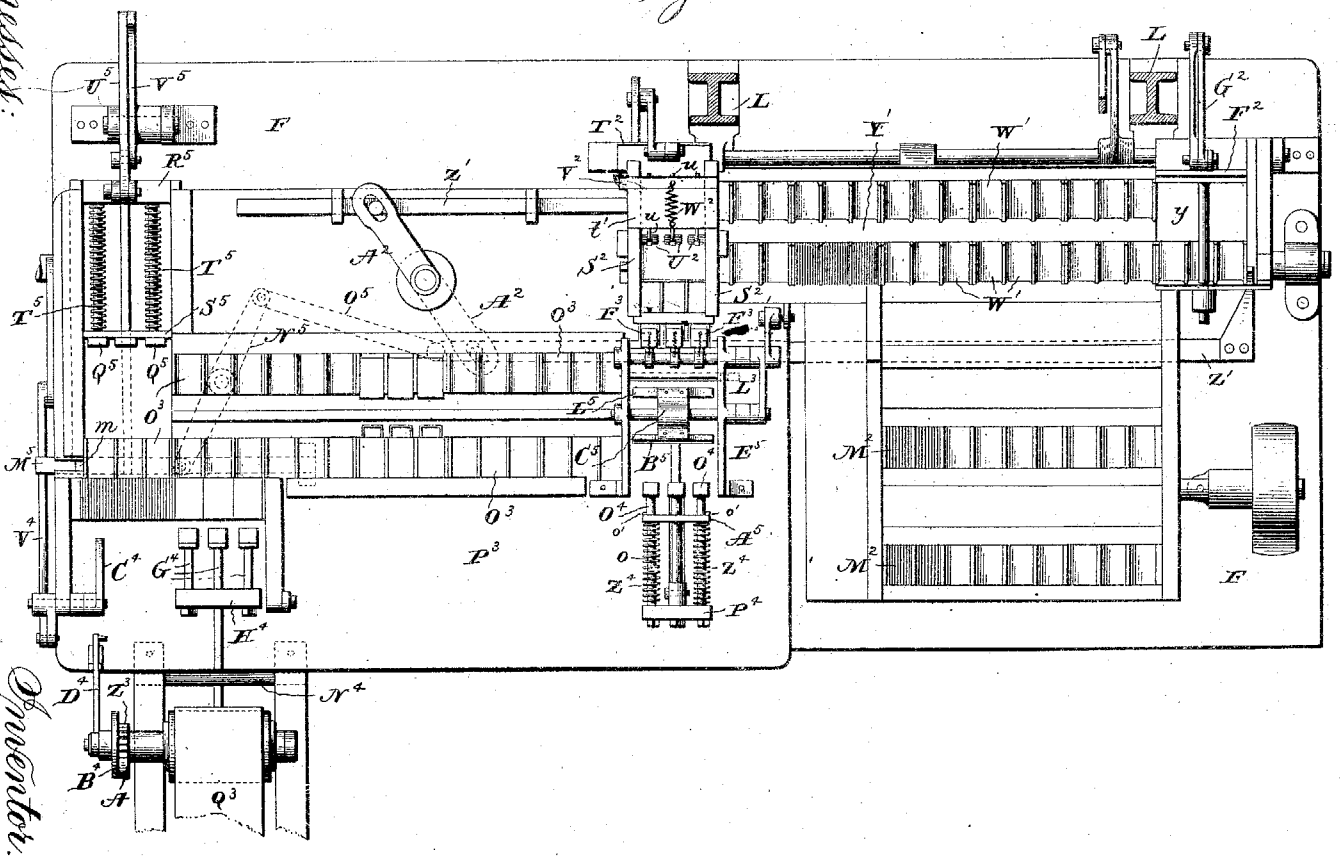

No. 12,366. REISSUED JUNE 27, 1905.

A. PAULSON.

MACHINE FOR FILLING MATCH BOXES.

APPLICATION FILED JUNE 8, 1900.

8 SHEETS—SHEET 1.

Witnesses:
Jas. E. Hutchinson
Henry C. Hazard

Inventor.
Andrew Paulson, by
Prindle and Russell, his Attys.

No. 12,366. REISSUED JUNE 27, 1905.

A. PAULSON.

MACHINE FOR FILLING MATCH BOXES.

APPLICATION FILED JUNE 8, 1900.

8 SHEETS—SHEET 2.

Witnesses:
Jas. E. Hutchinson
Henry C. Hazard

Inventor.
Andrew Paulson, by
Crindle and Russell, his Attys.

No. 12,366. REISSUED JUNE 27, 1905.

A. PAULSON.

MACHINE FOR FILLING MATCH BOXES.

APPLICATION FILED JUNE 8, 1900.

8 SHEETS—SHEET 3.

Witnesses:
Jas. E. Hutchinson
Henry C. Hazard

Inventor.
Andrew Paulson, by
Prindle and Russell his Attys

No. 12,366. REISSUED JUNE 27, 1905.

A. PAULSON.

MACHINE FOR FILLING MATCH BOXES.

APPLICATION FILED JUNE 8, 1900.

8 SHEETS—SHEET 4.

Witnesses:
Jas. E. Hutchinson.
Henry C. Hazard.

Inventor.
Andrew Paulson, by
Prindle and Russell, his Attys.

No. 12,366. REISSUED JUNE 27, 1905.

A. PAULSON.

MACHINE FOR FILLING MATCH BOXES.

APPLICATION FILED JUNE 8, 1900.

8 SHEETS—SHEET 5.

Witnesses:

Jas. E. Hutchinson.

Henry C. Hazard.

Inventor.

Andrew Paulson, by

Prindle and Russell his Attys.

No. 12,366. REISSUED JUNE 27, 1905.

A. PAULSON.

MACHINE FOR FILLING MATCH BOXES.

APPLICATION FILED JUNE 8, 1900.

8 SHEETS—SHEET 6.

Witnesses:
Jas. E. Hutchinson.
Henry C. Hazard.

Inventor.
Anders Paulson, by
Prindle and Russell his Attys

No. 12,366. REISSUED JUNE 27, 1905.

A. PAULSON.

MACHINE FOR FILLING MATCH BOXES.

APPLICATION FILED JUNE 8, 1900.

8 SHEETS—SHEET 7.

Witnesses:
Jas. E. Hutchinson.
Henry C. Hazard.

Inventor.
Andrew Paulson, by
Prindle and Russell, his attys.

No. 12,366. REISSUED JUNE 27, 1905.

A. PAULSON.

MACHINE FOR FILLING MATCH BOXES.

APPLICATION FILED JUNE 8, 1900.

8 SHEETS—SHEET 8.

Witnesses:
Jas. E. Hutchinson.
Henry C. Hazard.

Inventor.
Anders Paulson, by
Prindle and Russell, his Attys

No. 12,366

Reissued June 27, 1905.

UNITED STATES PATENT OFFICE.

ANDERS PAULSON, OF BREDA, NETHERLANDS, ASSIGNOR TO THE DIAMOND MATCH COMPANY, OF CHICAGO, ILLINOIS.

MACHINE FOR FILLING MATCH-BOXES.

SPECIFICATION forming part of Reissued Letters Patent No. 12,366, dated June 27, 1905.

Original No. 638,136, dated November 28, 1899. Application for reissue filed June 8, 1900. Serial No. 19,634.

*To all whom it may concern:*

Be it known that I, ANDERS PAULSON, of Breda, in the Kingdom of the Netherlands, did invent certain new and useful Improvements in Machines for Filling Match-Boxes, for which Letters Patent No. 638,136 were issued upon the 28th day of November, 1899, which Letters Patent have been found to be inoperative and defective and not to cover fully the invention set forth in the specification and shown in the drawings which were filed by me in the Patent Office upon the 25th day of November, 1898, preparatory to the obtaining of the said Letters Patent. Now, therefore, being desirous of reissuing the said Letters Patent I have prepared and do hereby declare the following to be a full, clear, and exact description of the said improvements, reference being had to the accompanying drawings, in which—

Figure 2:
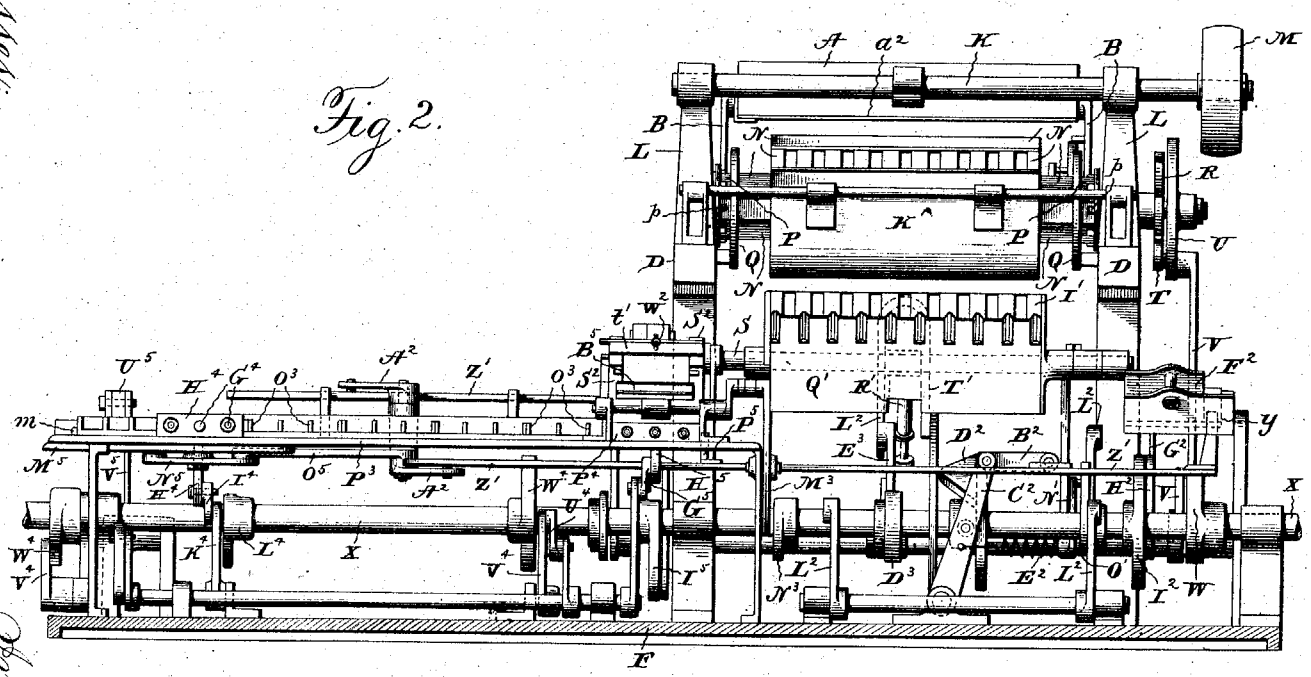
Figure 3:
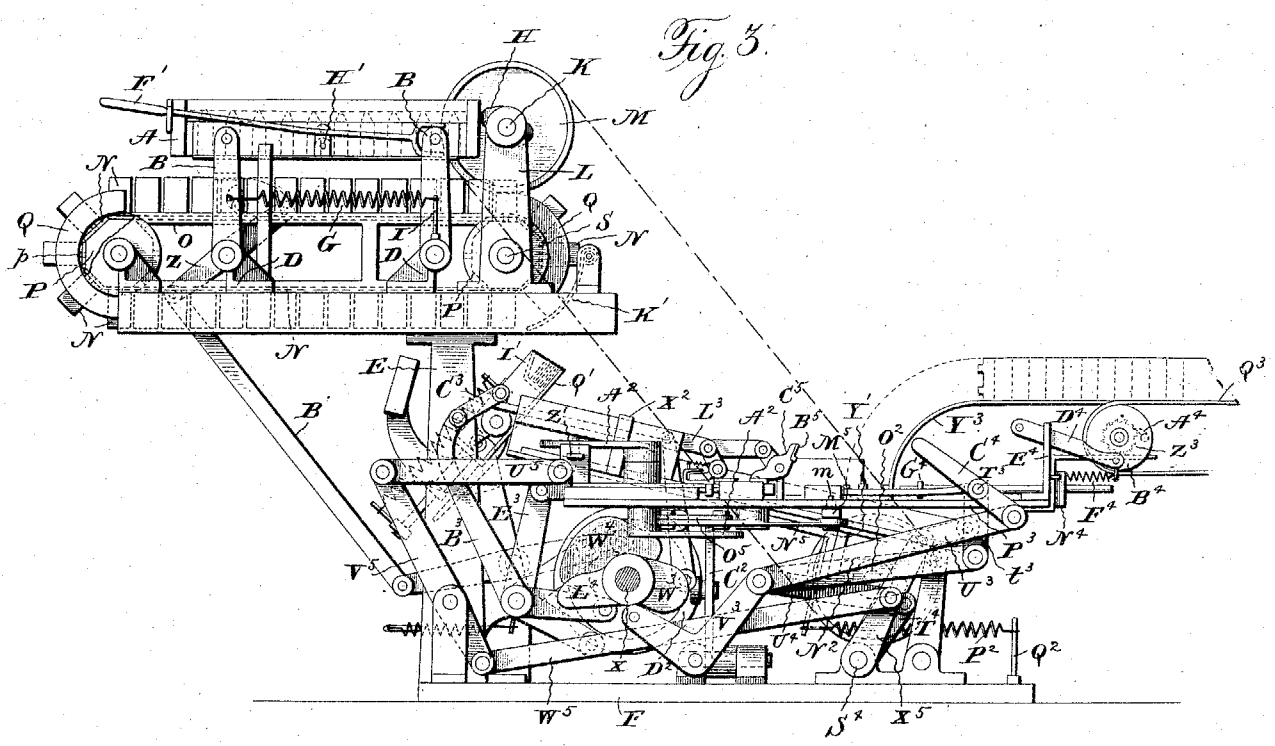
Figure 4:
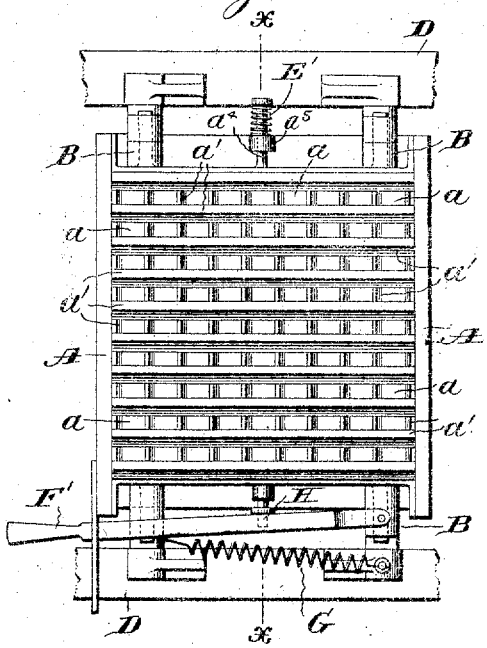
Figure 5:
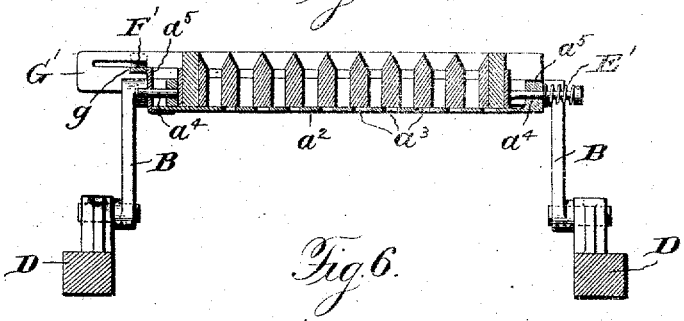
Figure 6:
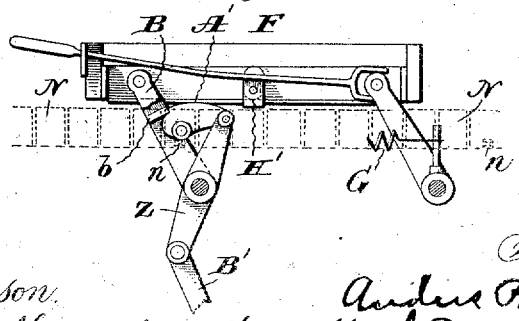
Figure 7:
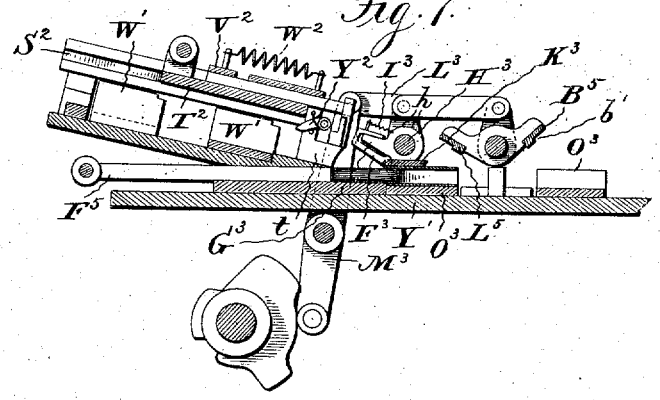
Figure 8:
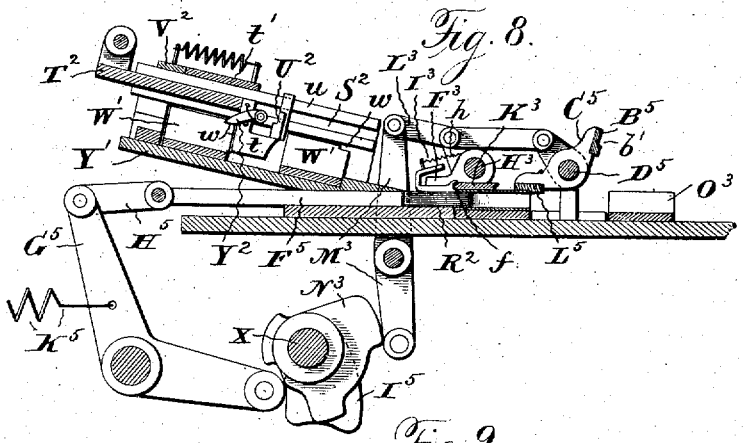
Figure 9:
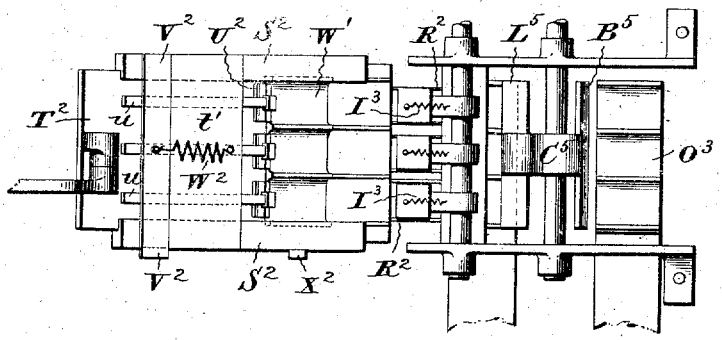
Figure 10:
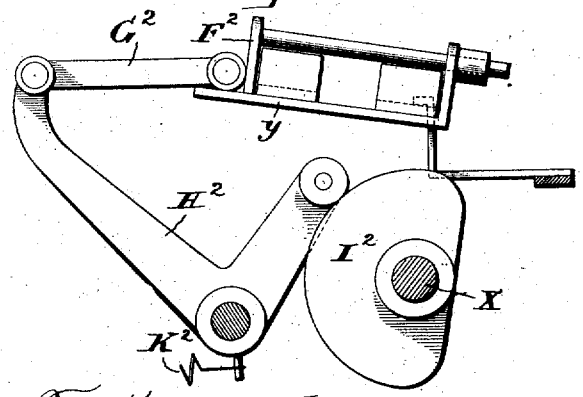
Figure 11:
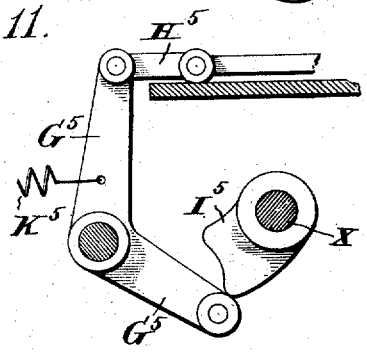
Figure 12:
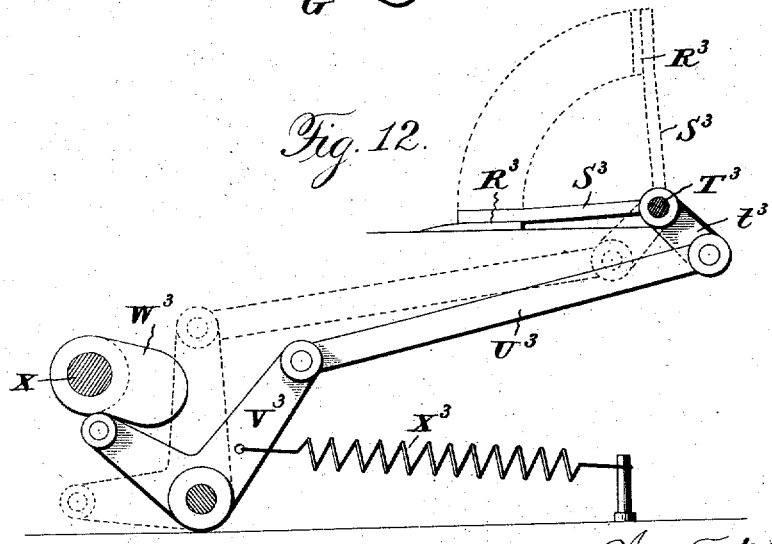
Figure 13:
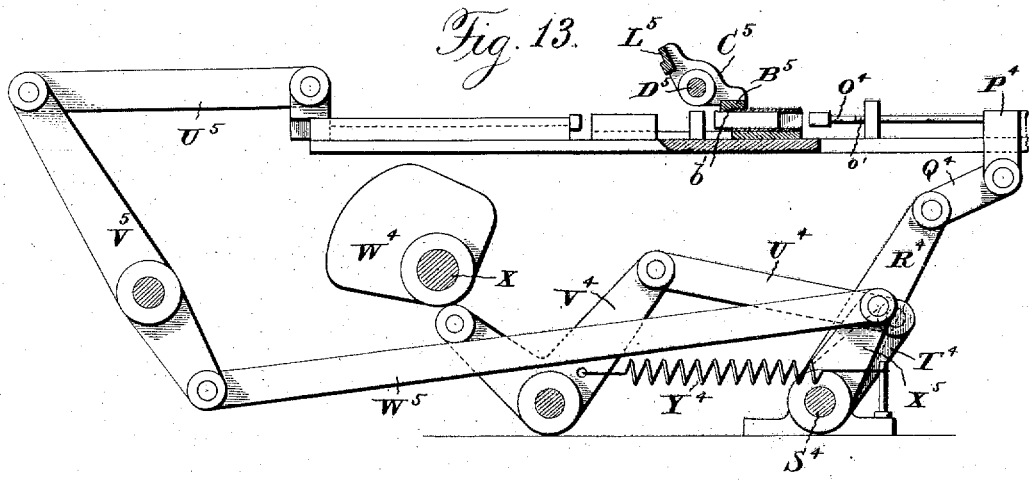
Figure 14:
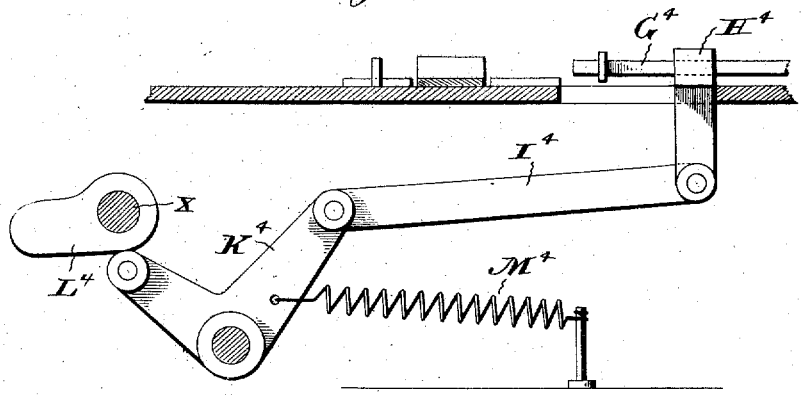
Figure 15:
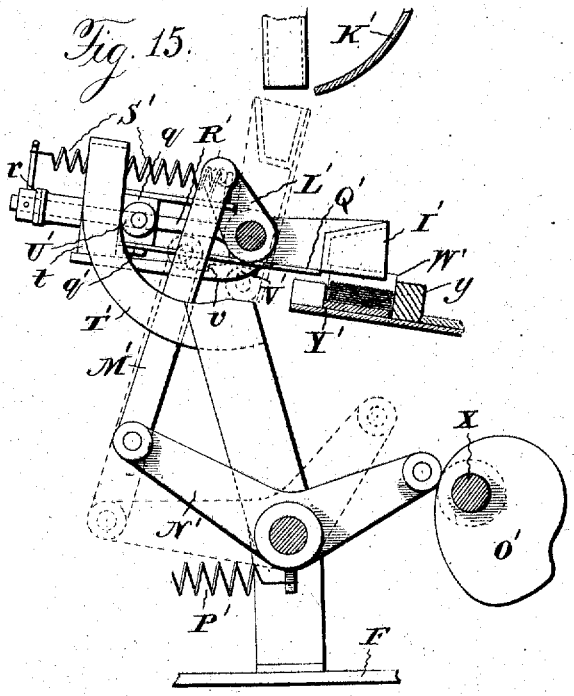
Figure 16:
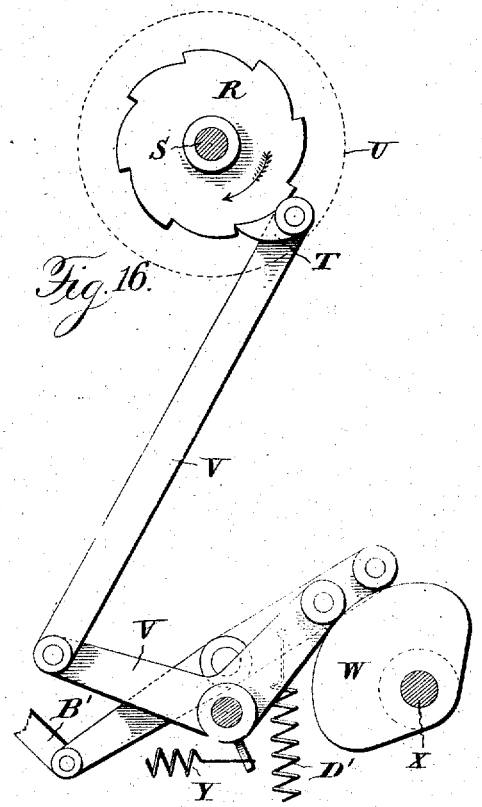
Figure 17:
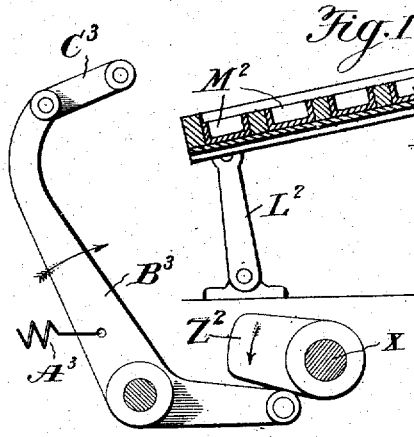
Figure 18:
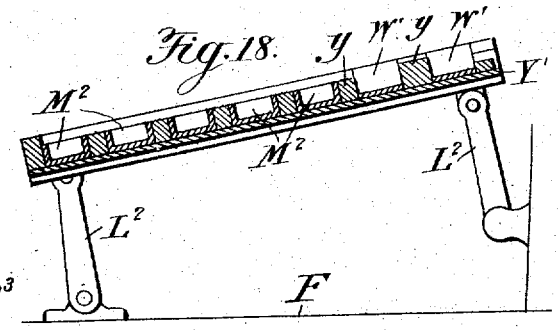

Figure 1 is a top plan view of a machine for boxing matches embodying my invention, the mechanism for delivering matches from the tray or dipping-frame to the match-conveyers being omitted; Fig. 2, a front elevation of the machine, excepting the inclined table and the match-conveyers supported thereby; Fig. 3, a side elevation of the machine; Fig. 4, a top plan view of the mechanism that receives the matches from the tray or dipping-frame; Fig. 5, a section of the same on the line $x\,x$ of Fig. 4; Fig. 6, a side elevation of said mechanism in position for emptying the matches. Figs. 7 and 8 are detail views in section of the mechanism for taking the matches from the conveyers and placing them in the boxes, showing the parts of such mechanism as, respectively, in two different positions; Fig. 9, a top plan view of said mechanism; Fig. 10, a detail view of the mechanism for shifting the match-conveyers from one row to the other; Fig. 11, a like view of the mechanism for transferring matches from the conveyers to the boxes; Fig. 12, a detail view of the mechanism for placing the empty boxes in position in the machine preparatory to putting them in the box-conveyers; Fig. 13, a like view of the mechanism for fully opening the boxes and for transferring the box-conveyers from one row to the other; Fig. 14, a detail view of the mechanism for putting empty boxes into the box-conveyers and partially opening them; Fig. 15, a detail view of the mechanism by which matches are transferred to the match-conveyers; Fig. 16, a like view of the mechanism for imparting an intermittent motion to the endless series of match-conveyers that receive matches from the box to which they are delivered from the dipping-frame; Fig. 17, a detail view of the cam and lever for operating the mechanism by which matches are removed from the match-conveyers to boxes; and Fig. 18 is a detail view in section on the line $x\,x$ of Fig. 1, showing the inclined vibratory table.

Letters of like name and kind refer to like parts in each of the figures.

The object of my invention is to provide an efficient machine of the kind by which matches may be taken from the dipping-frames and placed in boxes that are composed of a receptacle part or tray and a sliding cover, so that the whole operation of placing the matches in boxes and the closing of the latter may be done by the machine; and to this end said invention consists in the machine and in the parts thereof constructed and combined substantially as hereinafter specified.

The machine illustrated is designed for boxing matches that are dipped by having the splints secured in frames comprising splint-end-engaging clamps composed of strips or slats between which the splints, at one end, are placed and thus held. Accordingly I employ a horizontal quadrangular box A of a size corresponding with the size of the dipping-frame, upon which the latter may be laid with the heads of the matches downward, so that when the clamps are released the matches will fall from the frame into the box. The latter is divided into numerous small vertical compartments $a$ and $a$ by intersecting partitions $a'$ and $a'$, the upper edges of the partitions being beveled or wedge-shaped, so as not to impede the descent of the matches into the compartments. The horizontal dimensions of the latter are such that the matches cannot fall over sidewise, but are maintained in an upright position. The box A is mounted on the upper ends of four arms B and B, that are pivoted in bearings upon frame-bars D and D, that are supported by uprights E and E, rising from a frame-base F, and is yieldingly held by means of a spring G against a cam H, by whose revolution a shaking or jolting motion is imparted to the box and dipping-frame thereon that insures the dislodgment and descent of the matches into the box. The spring G has one end attached to one of the arms B and B and the other end to a stationary post or stud I. The cam H is upon a shaft K, journaled in bearings in standards L and L on the frame-bars D and D and having a wheel M, by which it may be revolved.

Beneath the box A is a conveyer comprising a series of unconnected links N and N, containing each a row of compartments equal in number to a parallel row of compartments in the box A, and each link being formed of a long sheet-metal base-plate and two shorter parallel similar plates perpendicular to the base-plate, between which at proper intervals are partitions to divide the space between said plates into compartments. The links are placed close together, with the base-plates thereof abutting or substantially abutting, and they are movable in an endless path composed of two horizontal straight portions, along which they are guided by guides O and O, upon which the ends of the base-plates rest, and curved portions at the extremities of the straight portions, at each of which is a polygonal or flat-sided drum P and a pair of curved plates Q and Q concentric with the drum, the inner peripheries of which are engaged by the base-plates near their ends, and thus the links guided when carried by the drum in passing from one straight portion of the path to the other. On the flat sides of the drums, at the ends thereof, are pins or projections $p$ and $p$, that engage openings in the base-plates of the links, and motion being imparted to the drums the links are thereby moved along, those not engaged by the pins $p$ and $p$ being pushed along by the ones that are engaged. An intermittent or step-by-step movement is imparted to the series of links by means of a ratchet-wheel R upon the shaft S of one of the drums and a pawl T on a disk U, which is connected to a lever V, that is swung in one direction by means of a cam W on a driving-shaft X and in the opposite direction by a spring Y.

For delivering the matches in the compartments of the box A to the conveyer-links N and N said box is lowered to place it close to the links N and N, and the bottom $a^2$ of the box is moved to place perforations $a^3$ and $a^3$ therein under the box-compartments to permit the matches to fall from the box into the conveyer-links N and N. For so moving the box there is employed a lever Z, pivoted concentric with one of the pairs of arms B and B, which at one end has pivoted to it a dog or pawl A′, whose free end rests on the base-plates of the upper straight lines of links N and N in the path of projections $n$ and $n$ at intervals on the ends of the links—in the instance shown every ninth link—and said lever being connected at its other end by a link B′ to a lever C′, that is moved by the cam W in one direction and by a spring D′ in the opposite direction. When engaged and lifted by a projection $n$, the pawl A′ engages a lug $b$ on one of the arms B and B, and thereby the latter and the box are moved downward; but at other times the lever Z and its pawl A′ vibrate idly.

The bottom $A^2$ of the box A at opposite sides of the latter has vertical lugs $a^3$ and $a^3$, through which pass pins $a^4$ and $a^4$ on the respective sides of the box, upon which pins the bottom is slidingly supported. A spring E′, interposed between a head on one of the pins $a^4$ and the adjacent lug $a^5$, yieldingly holds the bottom with its openings under the box-compartments, while a lever F′, pivoted at one end to the box A and coöperating with a notch $g$ in a latch-bar G′, also on the box A, holds the bottom against the pressure of the spring with its openings out of line with the compartments of the box. By the descent of the latter the lever F′ is brought against a stop H′, and thereby freed from the notch $g$, so that the spring can slide the box-bottom and place its openings beneath the box-compartments. On the retraction of the pawl A′ the box A is restored by the spring G to its raised position, and by moving the lever F′ and reengaging it with the notch $g$ the box-bottom openings are again placed out of line with the box-compartments.

From the links N and N the matches are delivered to a pivoted carrier I′, that has at one end a row of compartments which by the motion of the carrier are moved from a point beneath the conveyer formed of the links N and N to a point where the matches are to be discharged into other moving holders or conveyers, as hereinafter described. The delivery of matches from the links N and N to the carrier I′ is effected by the inversion of the links in passing from the upper straight portion of their path to the lower straight portion, the matches being prevented from prematurely falling out of said links while the latter are being inverted by means of a curved plate K′, placed in a position where it is close to the open ends of the link-compartments from a point where there is likelihood that the matches will spill out to the point where said compartments come directly over those of the carrier I′. For swinging the latter to and from its receiving and discharging positions there is fixed to the shaft upon which it is mounted a crank L′, that is connected by a link M′ to a lever N′, that is moved in one direction by a cam O′ upon the shaft X and in the opposite direction by a spring P′.

The delivery of matches from the carrier I′ is effected by making the wall Q′ of the carrier-compartments, which is the lower wall at the time said compartments are in their lowered position, movable from beneath the matches, so that the latter will be free to fall from the carrier. The wall Q′, which is in the form of a plate, is attached to a block or piece *q*, slidingly mounted on a rod R′, attached to the carrier I′, being movable thereon in the direction to withdraw said wall from beneath the matches by means of a spring S′ and in the opposite direction by an arc-shaped stationary cam T′ and a roller U′ on the block that travels along the cam as the carrier swings from the lower to the higher position. The sliding wall is held in match-supporting position by means of a spring-pressed arm V′, pivoted on the carrier-shaft, that has a notch *v*, which engages a lug *q′* on the block *q*. Said arm is disengaged from the block and the wall thus freed for movement by the spring by means of a stop *t*, attached to the cam T′, which the arm strikes just before the carrier reaches its lowermost position. A buffer-disk *r* on the rod R′, faced with leather, limits the movement of the wall by the action of the spring.

From the carrier I′ the matches fall into conveyers W′ and W′, by which the matches are taken to the place where they are put in the match-boxes. The match-conveyers W′ and W′ consist each of a base or bottom and ends and division pieces or partitions intermediate the ends, which form three compartments. The conveyers W′ and W′ are arranged end to end, but unconnected, in two parallel rows in grooves or guideways in the upper side of a table Y′, through which they are moved in opposite directions, the conveyers after being filled in one groove being transferred to the other for movement therethrough to be emptied into the match-boxes and then returned empty to the first-mentioned groove for passage along the same to be filled again. For moving the rows of conveyers through their respective guideways there is employed for each row a reciprocating rod Z′, one of whose ends engages the end one of the conveyers in the row and by its movement moves the entire row, the distance they are moved being equal to the length of one of the conveyers. One of the rods or bars Z′ and Z′ is beneath the table Y′ and the other is above said table, and the two are connected to move simultaneously, but in opposite directions, by a lever A². To the one beneath the table there is connected by a short link B² a lever C², that is moved in one direction by a cam D² on the shaft X and in the opposite direction by a spring E². The conveyers after being filled with matches are shifted one at a time from the end of one row to the end of the adjacent row, being passed for this purpose to an extension *y* of the table Y′ and engaged and moved thereon by a pusher F², that is connected by a link G² with a lever H², which is moved in one direction by a cam I² on the shaft X and in the opposite direction by a spring K². The guideways for the conveyers are formed by parallel ledges or bars *y* and *y* on the table. (See Fig. 18.)

The table Y′ is supported in an inclined position and so that it may be vibrated or shaken upon pivoted arms or levers L² and L² in order that such matches as may be in the conveyers in excess may be shaken out of the same before the conveyers reach the place where the matches are to be transferred to match-boxes. It will be evident that the excess matches only can pass from the conveyers, the matches to be retained being prevented from passing out of the conveyers by the lower ledge *y* of the guideway. It will be seen that by reason of the inclination of the table matches overflowing the upper row of conveyers will slide therefrom over the lower ledge *y* of the guideway of said row into the conveyers in the lower row and that in like manner matches overflowing the conveyers of the lower row will slide therefrom over the lower ledge *y* of the guideway of said lower row. For the reception of said excess matches as thus pass from the conveyers rows of compartments M² and M² are placed on the table at points successively lower and lower down the same, (see Fig. 18,) the matches first filling those highest and then passing on to those next lower down. Said compartments can afterward be emptied into the box A. For vibrating or shaking the table Y′ there is employed a cam N² upon a shaft O² and a spring P², having one end secured to the table and the other to a post Q² on the base F.

When each conveyer filled with the required quantity of matches reaches the end of the lower guideway, the matches are transferred therefrom into boxes R² and R², which are fed into the machine, as hereinafter described. As each conveyer shown has three compartments, each of which holds a quantity of matches to fill one box, there are three boxes R² and R² in readiness at one time to receive matches. Above the conveyer at the end of the row in guides S² and S² on the table Y′ is a sliding plate T², on the under side of which are three blocks *t* and *t*, that respectively are in line with the three compartments of the conveyer and when moved downward therethrough push therefrom the matches into the boxes. The matches while being thus pushed along are prevented working upward by means of holders in the form of a block or piece U² for each compartment of matches, which are in such position that their under sides may engage the uppermost matches in the compartment. Each of the holder-blocks is attached by a rod $u$ to a bar $V^2$, slidingly mounted on the guides $S^2$ and $S^2$, and over said rods $u$ and $u$ is a plate $t'$, which is attached to the sliding plate $T^2$, against the upper edge of which the bar $V^2$ is yieldingly held by a spring $W^2$, attached at one end to said bar and at the other end to the plate $t'$, the relative positions of pushers and their respective holder-blocks being such that the latter are in advance of the pushers. In this position it is desired that they remain until the matches have been nearly placed in the box, and they accordingly move together until such point has been reached, whereupon a stop $X^2$ in the path of the bar $V^2$ arrests the latter and the holder-blocks and the pushers continue their movement alone until they have passed beneath said holder-blocks, and thus carried the matches from beneath the latter. The return movement of the pushers is utilized to shift the now empty conveyer from the lower row to the upper row, and for this purpose a pawl $Y^2$ is carried by the plate $T^2$, which engages a notch $w$ in the conveyer $W'$. The reciprocation of the plate $T^2$ and its attached parts is effected by means of a cam $Z^2$ on the shaft X and a spring $A^3$, which vibrate a lever $B^3$, that is connected by a link $C^3$ with the plate $T^2$.

During the time the conveyers $W'$ and $W'$ are being shifted from one row to another and the rows moved it is necessary to stop the vibration of the inclined table $Y'$ to avoid interference with such operations, and for this purpose the table is moved and temporarily held out of contact with its vibrating cam by means of a cam $D^3$ on the shaft X and an arm $E^3$, engaging said cam and connected with one of the sets of table-supporting arms $L^2$ and $L^2$.

The matches having been delivered into the boxes $R^2$ and $R^2$ are pressed downward therein by a presser for the matches in each box, that consists of a shoe $F^3$ and a crank-arm $G^3$ on a shaft $H^3$, the shoe having a slot or recess into which the crank-arm extends and being loosely connected thereto by a spring $I^3$. When moved by the crank-arm to match-pressing position, a sharp edge $f$ of the shoe passes slightly beneath and binds the box-cover against the under side of a plate $K^3$, beneath which the box lies when being filled, and thus the box-cover is maintained in proper position while the box is being filled. The cover is freed from the grip of the shoe edge $f$ when the presser is raised. The yielding or loose connection between the crank-arm and the shoe is needful because the center of motion of the shoe, being the edge of the plate $K^3$, is eccentric to the shaft $H^3$. For rocking said shaft $H^3$ to operate the presser, as described, it has a crank-arm $h$, to which by a link $L^3$ is attached a lever $M^3$, that engages a cam $N^2$ on the shaft X. The movement of the holder-blocks $U^2$ and $U^2$ is arrested, as above set forth, so that they will not interfere with the action of the pressers.

The match-boxes $R^2$ and $R^2$ are transported to and from the filling-place by conveyers $O^3$ and $O^3$, similar to those which carry the matches and which, like the match-conveyers, move in rows in two parallel grooves or guideways in a table $P^3$, from one to the other of which the end conveyers of two rows are transferred. The boxes to be filled are placed in a closed condition on end on an endless band or conveyer $Q^3$, which is wide enough to hold them in rows of three. From the conveyer $Q^3$ a row of three at a time is taken by a carrier device that comprises a plate $R^3$, attached at the ends to two arms $S^3$ and $S^3$ on alining shafts $T^3$ and $T^3$, journaled on the table $P^3$. To one of the shafts $T^3$ is fixed a crank-arm $t^3$, that is connected by a link $U^3$ with a lever $V^3$, which by the action of a cam $W^3$ on the shaft X and a spring $X^3$ swings said arms to move the plate between the conveyer and the table $P^3$. The plate $R^3$ has division pieces or partitions with small flat springs to engage the sides of the boxes to hold the latter to the plate, and adjacent to the bottoms or ends of the boxes when carried by the plate is a curved arc-shaped plate $Y^3$. An intermittent movement is given the conveyer $Q^3$ equal to the thickness of a box $R^2$ by means of a ratchet-wheel $Z^3$ on the shaft of one of the conveyer-drums and a pawl $A^4$ on a disk $B^4$ concentric with said shaft, to which disk motion is given in one direction by means of a lever $C^4$ on one of the shafts $T^3$, which acts on a bar $D^4$, pivoted to the disk and slidingly supported in the fork of a bar E on the table $P^3$ and in the opposite direction by means of a spring $F^4$.

From the plate $R^3$ the boxes are moved into the guideway, which leads to the place where the boxes are to receive the matches, by means of three plungers $G^4$ and $G^4$, carried by a cross-head $H^4$, which by a link $I^4$ is connected to a lever $K^4$, that is vibrated by a cam $L^4$ on the shaft X and a spring $M^4$. The shank of the middle plunger is extended to pass through a guide-bar $N^4$. Each plunger $G^4$ has such a size that it can enter the box-cover, and hence when the box is pushed into the guideway and stopped by the opposite end of the cover, engaging, as it does, the edge of the guideway, continued movement of the plunger will thrust the box out of the cover. Such continued movement, however, is only sufficient to partially open the box. The three empty boxes in the conveyer at the other end of the row are further opened to the desired degree by three plungers $O^4$ and $O^4$, that are attached to a cross-head $P^4$. The latter is connected by a link $Q^4$ to a lever $R^4$ on a rock-shaft $S^4$, which is oscillated by means of a lever $T^4$, that is connected by a link $U^4$ to a crank-arm $V^4$ on said shaft and is operated by a cam $W^4$ on the shaft X and a spring $Y^4$. On the rods $o$ and $o$ of the respective plungers $O^4$ and $O^4$ are coiled springs $Z^4$ and $Z^4$, interposed between the cross-head and a cross-bar $A^5$ on said rods, which is held against a projection $o'$ on each of said rods by said springs. During the time the boxes are being thus further opened the covers thereof are held from movement by a bar $B^5$, that has a ledge or rib $b'$ to engage the ends of the box-covers. Said bar $B^5$ is carried by an arm $C^5$, pivoted to a shaft $D^5$, which is rocked to apply said bar to and remove it from the box-covers by means of a crank-arm $E^5$, which is connected to an extension of the link $L^3$. The boxes having been opened to the desired extent, the bar $B^5$ is raised, and the movement of the plungers continuing the cross-bar $A^5$, engaging the conveyer holding said boxes, moves the conveyer and the boxes to the other row and in match-receiving position. Having been filled, as hereinbefore described, the boxes are partially closed by plungers $F^5$ and $F^5$, that engage the ends of the boxes and are reciprocated by a lever $G^5$, with which they are connected by a link $H^5$ and which is vibrated by a cam $I^5$ on the shaft X and a spring $K^5$. The covers are held in position during the operation of the plungers $F^5$ and $F^5$ by being engaged by a bar $L^5$, similar to the bar $B^5$, and carried by an extension of the arm $C^5$.

The conveyers with the filled and partially-closed boxes are moved endwise in a row from the place where they are filled to the place for the complete closing and removal of the filled boxes, and during the time of their travel between these two points they can be inspected to ascertain if all are properly filled. The endwise movement of the two rows of box-carriers, which is in opposite directions, is produced in the case of the row with empty boxes by means of a flat rod or bar $M^5$, which has an upright $m$, that engages the end conveyer of the row and is actuated by a lever $N^5$, that is connected by a link $O^5$ with the lower rod or bar $Z'$ of the match-conveyer-moving mechanism. In the case of the conveyers with the filled match-boxes the row is moved by means of an upright $P^5$ on said bar $Z'$, which engages the end conveyer of the row. When the conveyer with filled boxes reaches the end of the row opposite that where the filling devices are, the boxes and their conveyers are in position to be acted on by mechanism which moves the boxes and their conveyer to the other row, then moves them from such conveyer to the plate $R^3$ for removal from the machine, and closes them. Such mechanism comprises three plungers $Q^5$ and $Q^5$, attached to a cross-head $R^5$ and a cross-bar $S^5$ on the shanks of the plungers and yieldingly held against the heads of the plungers by coiled springs $T^5$ and $T^5$, interposed between the bar and the cross-head. For reciprocating the latter it is connected by a link $U^5$ to a lever $V^5$, which is connected by a link $W^5$ to an arm $X^5$ on the rock-shaft $S^4$. On the forward movement of the cross-head the boxes are engaged by the respective plungers and are moved slightly in the conveyer until the latter is engaged by the cross-bar $S^5$, whereupon conveyer and boxes move together until the conveyer is arrested in line with the row of empty boxes by engaging a stop or ledge on the table $P^3$. The movement of the plungers being continued, (such being possible because of the springs $T^5$ and $T^5$,) the boxes are pushed from the conveyer over to the plate $R^3$ until the covers encounter and are stopped by the curved plate $Y^3$, whereupon the boxes are pushed entirely within the cover. As the filled and closed boxes now rest on the plate $R^3$ at the side of the portion which receives the empty boxes, said plate when raised from the table carries the boxes upward over the curved plate at the side of the portion over which the empty boxes pass to a channel or guide, whence they can pass ~~from the~~ machine.

The movements of the various parts of the machine illustrated are so timed that in nine revolutions of the main shaft X the box A is emptied once. In one revolution thereof the contents of one link N are deposited in the carrier I'. In one revolution of said shaft the carrier empties its contents into three match-conveyers W' and W', which as they move longitudinally only the length of one for one revolution of the main shaft therefore receive the contents of the carrier three times in passing the same, and in one revolution of the main shaft three empty boxes are placed in the machine, three empty boxes moved to filling position and filled, and the like number filled and closed are removed from the machine. All of the operations are performed automatically, except those of placing the filled dipping-frames upon and removing the empty ones from the machine and in putting the boxes to be filled on the conveyer $O^3$ and $O^3$.

Having thus described my invention, what I claim is—

1. The combination of a source of supply of matches, a series of unconnected movable match holders or conveyers that travel to and from such source of supply, a series of unconnected movable box holders or conveyers, means whereby matches from the match-conveyers are placed in the boxes, and guide-ways for the respective holders or conveyers, along which the latter are moved, substantially as and for the purpose described.

2. The combination of a source of supply of matches, a series of unconnected movable match holders or conveyers that travel to and from such source of supply, a series of unconnected movable box holders or conveyers, the paths traveled by the two series being contiguous at the extremities thereof, and means for passing matches from the match-conveyers to the boxes, substantially as and for the purpose described.

3. The combination of a source of supply of matches, a series of unconnected movable match holders or conveyers, parallel communicating guideways in which said conveyers travel to and from such source of supply with their open sides upward, and from one to the other of which they are shiftable, means for presenting boxes contiguous to said guideways, and means for passing matches from the conveyers to boxes, substantially as and for the purpose described.

4. The combination of a source of supply of matches, a series of conveyers therefor having sides but no ends, a series of like conveyers for boxes comprising a tray and cover, means for moving matches endwise from their conveyers into the boxes, and means for moving boxes endwise from their conveyers, substantially as and for the purpose described.

5. The combination of a source of supply of matches, a series of conveyers therefor having sides but no ends, a series of like conveyers for boxes comprising a tray and cover, means for moving matches endwise from their conveyers into the boxes, and means for moving the boxes endwise from their conveyers and closing the boxes, substantially as and for the purpose described.

6. The combination of a source of supply of matches, unconnected conveyers for boxes, parallel guideways for the conveyers, means for moving conveyers with empty boxes from one guideway to the other, means for filling the boxes, and means for moving conveyers with filled boxes from one guideway to the other, substantially as and for the purpose described.

7. The combination of a source of supply of matches, unconnected conveyers for boxes, parallel guideways for the conveyers, means for moving conveyers with empty boxes from one guideway to the other, means for filling the boxes, means for moving conveyers with filled boxes from one guideway to the other, and means for moving the filled boxes from the conveyers, substantially as and for the purpose described.

8. The combination of two series of conveyers, one for matches and one for boxes, with their ends contiguous, and each series comprising two rows, from one to the other of which the conveyers thereof are movable, and means for moving matches from the match-conveyers to the boxes in the box-conveyers, substantially as and for the purpose described.

9. The combination of two series of conveyers, one for matches and one for boxes, with their ends contiguous, and each series comprising two rows, from one to the other of which the conveyers thereof are movable, means for moving matches from the match-conveyers to the boxes in the box-conveyers, and means for moving the filled boxes from their conveyers and closing them, substantially as and for the purpose described.

10. The combination of a match-receiver support, traveling match-receivers supported in an inclined position thereon, means for vibrating the support to shake the matches, and means for placing the matches in the receivers in boxes, substantially as and for the purpose described.

11. The combination of a match-receiver support, receivers supported thereby placed one laterally of and in a higher plane than the other so that excess matches may pass from one to the other, means whereby the matches in the receivers may be vibrated or shaken, and means for placing the matches in the receivers in the boxes, substantially as and for the purpose described.

12. The combination of a match-receiver support, inclined traveling receivers placed one laterally of and in a higher plane than the other so that excess matches from one may pass to the other, means whereby the matches in the receivers may be vibrated or shaken, and means for placing the matches in the receivers in boxes, substantially as and for the purpose described.

13. The combination of a match-receiver support, match-receivers supported in an inclined position on said support, means for moving them thereon, placed one laterally of and in a higher plane than the other so that excess matches from one may pass to the other, means whereby the matches in the receivers may be vibrated or shaken, and means for removing the matches from the receivers, substantially as and for the purpose described.

14. The combination of a match-receiver support, match-receivers, means for moving them on the support in an inclined position, placed one laterally of and in a higher plane than the other so that excess matches from one may pass to the other, means whereby the matches in the receivers may be vibrated or shaken, and means for removing the matches from the receivers, substantially as and for the purpose described.

15. The combination of a match-receiver support, match-receivers that are movable thereon in an inclined position, in adjacent parallel rows, one row being above another, and means whereby the matches in the receivers may be vibrated or shaken, substantially as and for the purpose described.

16. The combination of an inclined match-receiver support, match-receivers that are movable in adjacent parallel rows, one row being above another, and means to vibrate or shake said support, substantially as and for the purpose described.

17. The combination of an inclined match-receiver support, match-receivers that are movable in opposite directions in adjacent parallel rows, one row being above the other, and means to vibrate or shake said support, substantially as and for the purpose described.

18. The combination of an inclined match-receiver support, guides for the receivers that are situated one above another, and means to vibrate or shake the support, substantially as and for the purpose described.

19. The combination of a match-receiver support, match-receivers supported thereon in an inclined position, means to shake the same to remove excess matches, a receptacle for the latter, and means to remove the matches from the receivers, substantially as and for the purpose described.

20. The combination of match-conveyers, an inclined support therefor, means for imparting an intermittent movement to the conveyers, and means for intermittently vibrating the support, substantially as and for the purpose described.

21. The combination of match-conveyers, moving in higher and lower paths with open sides upward in both paths, means for imparting an intermittent onward movement to them, and means for vibrating the conveyers only during their periods of rest in their onward movement, substantially as and for the purpose described.

22. The combination of match-conveyers, moving onward in higher and lower paths of opposite directions, with open sides upward in both paths, means for imparting intermittent movement to them, means for transferring them from one path to the other, and means for vibrating the conveyers in their periods of rest in their onward movement, substantially as and for the purpose described.

23. The combination of match-conveyers, an inclined support therefor having guideways in which the conveyers move in opposite directions, means for imparting intermittent movement to the conveyers, means for transferring them from one guideway to the other, and means for intermittently vibrating the support, substantially as and for the purpose described.

24. The combination of match-conveyers, an inclined table, means for moving the conveyers in higher and lower paths across the table, and means for vibrating the table, substantially as and for the purpose described.

25. The combination of a match-receiving box having a movable bottom, match-conveyers, means to move said bottom to discharge matches from the box, an oscillating carrier receiving matches from the conveyers, having a movable wall, means to move said wall to discharge matches, and means, comprising conveyers that receive matches from said carrier, for delivering matches to boxes, substantially as and for the purpose described.

26. The combination of a box made with compartments and having a perforated movable bottom, an oscillating carrier, a conveyer for transferring the matches from said box to said carrier, a series of match-conveyers into which the matches are placed by said carrier, an inclined table having depressions or guideways in which said conveyers move, a series of match-box conveyers, reciprocating slides for pushing the matches from said match-conveyers into the match-boxes, reciprocating plungers for pushing the inner parts of the match-boxes into and out of their covers, and a turning-over or reversing plate whereby the empty match-boxes are fed toward the match-conveyers and the filled match-boxes are discharged, substantially as and for the purpose described.

27. The combination of a box formed with a number of compartments for the reception of matches and with a perforated movable bottom, swinging supporting-levers carrying said box, a rotary cam for shaking said box, an oscillating cam or pawl, a projection on one of said supporting-levers adapted to be engaged by said cam or pawl, a spring acting on said movable bottom of the box, and a locking-lever for holding said bottom against the action of said spring, substantially as and for the purpose described.

28. The combination of a box formed with a number of compartments for matches and having a perforated movable bottom, arms carrying said box, a projection on one of said arms, a conveyer comprising unconnected links, guides for the links, projections on some of the links, a pawl in the path of such projections adapted to engage the arm projection, and means for moving the box, substantially as and for the purpose described.

29. The combination of a pivoted carrier having a row of compartments, a movable wall for the said compartments, a spring for retracting said movable wall, a roller on said movable wall, a cam-surface for engaging with said roller, a catch for holding said movable wall in its extended position, and a stop for disengaging said catch, substantially as and for the purpose described.

30. The combination of an inclined yieldingly-supported table, match-conveyers adapted to move in guideways in said table, reciprocating bars for moving said conveyers along said guideways and from one guideway to another, a rotary cam for imparting a shaking or oscillating motion to said table, and means for interrupting said shaking motion, substantially as and for the purpose described.

31. The combination of a table, match-box conveyers arranged in guideways in said table, a turning-over plate for feeding empty match-boxes to said conveyers, a conveyer for feeding said boxes to said turning-over plate, reciprocating bars for moving said conveyers along said guideways and from one guideway to another, reciprocating plungers for pushing the match-boxes into said conveyers and for pushing the inner parts of said boxes into and out of their covers, and means for feeding matches into said boxes while held in said conveyers, substantially as and for the purpose described.

32. The combination of tables provided with guideways, match-conveyers and match-box conveyers, arranged respectively in double rows, reciprocating bars whereby the carriers in the two rows of each series are moved in opposite directions, and means such as are hereinbefore described, for transferring said conveyers from one row to the other, substantially as and for the purpose described.

33. The combination of match-conveyers, match-box conveyers, arranged, respectively, in double rows, and a filling apparatus comprising reciprocating pieces, means for holding the match-boxes in said match-box conveyers, means for transferring said match-box conveyers from one row to the other, and pressers for guiding and pressing the matches into the match-boxes, substantially as and for the purpose described.

34. The combination of a match-conveyer, and means for removing matches therefrom into boxes, comprising a pusher to engage the ends of matches, a part to engage the sides of matches movable with and in the same direction as the pusher, and means to limit the movement of the latter part before the completion of the movement of the pusher, substantially as and for the purpose described.

35. The combination of match-conveyers, movable in two guideways, a reciprocating pusher for removing matches therefrom, and a part carried by the pusher to shift the emptied conveyer from one guideway to the other, substantially as and for the purpose described.

36. The combination of box-filling mechanism, a presser for matches placed in a box having an edge to engage the box-cover, and means for closing the box, substantially as and for the purpose described.

37. The combination of box-filling mechanism, a presser for matches placed in a box having an edge to enter and engage the box-cover, and means for closing the box, substantially as and for the purpose described.

38. The combination of box-filling mechanism, a swinging presser having an edge to enter and engage the box-cover, a surface against which the cover is held by such edge, and means for closing the box, substantially as and for the purpose described.

39. The combination of means for opening and closing a box composed of a tray and cover, and a holding device for the cover that holds the same in both opening and closing the box, the box being presented in two positions for the action of the holding device successively thereon, substantially as and for the purpose described.

40. The combination of means for opening a box, composed of a tray and cover, means for closing the same, and a pivoted piece having parts to hold the cover in the opening and closing of the box, substantially as and for the purpose described.

In testimony that I claim the foregoing I have hereunto set my hand this 27th day of April, 1900.

ANDERS PAULSON.

Witnesses:
ALBERT C. LISTOE,
AIRE H. VOORWENDEN.